(12) United States Patent
Jun et al.

(10) Patent No.: US 6,374,119 B1
(45) Date of Patent: Apr. 16, 2002

(54) SYSTEM AND METHOD FOR IN-BUILDING MOBILE COMMUNICATIONS

(75) Inventors: Ju-Sung Jun, Kunpo; Sang-Keun Lee, Seoul, both of (KR)

(73) Assignee: Hansol PCS Co. Ltd. (KR)

( * ) Notice: Subject to any disclaimer, the term of this patent is extended or adjusted under 35 U.S.C. 154(b) by 0 days.

(21) Appl. No.: 09/434,964

(22) Filed: Nov. 5, 1999

(30) Foreign Application Priority Data

May 27, 1999 (KR) ............................................ 99-19281

(51) Int. Cl.⁷ ................................................. H04B 7/00
(52) U.S. Cl. ........................ 455/523; 455/11.1; 455/20
(58) Field of Search ............................... 455/523, 11.1, 455/20, 561, 18

(56) References Cited

U.S. PATENT DOCUMENTS

| | | | | |
|---|---|---|---|---|
| 4,539,706 A | * | 9/1985 | Mears et al. | 455/11 |
| 4,882,765 A | * | 11/1989 | Maxwell et al. | 4555/18 |
| 5,907,794 A | * | 5/1999 | Lehmusto et al. | 455/11.1 |
| 5,918,154 A | * | 6/1999 | Beasley | 455/11.1 |
| 5,991,599 A | * | 11/1999 | Uchikawa | 455/20 |
| 6,122,529 A | * | 9/2000 | Sabat, Jr. et al. | 455/561 |

FOREIGN PATENT DOCUMENTS

WO         9845956         10/1998

* cited by examiner

*Primary Examiner*—Daniel Hunter
*Assistant Examiner*—Lana Le
(74) *Attorney, Agent, or Firm*—Baker Botts LLP

(57) ABSTRACT

Disclosed is a mobile communication system and method. A base station (BS) transmits and receives signals using predetermined serving frequency signals. A donor module, coupled to the BS, converts output signals of the BS into intermediate frequency (IF) signals and performs a power control operation on the signals and outputs resulting signals to a path. Each of a plurality of remote modules receives output signals of the donor module through the path and converts the signals into serving frequency signals, then outputs the converted signals to a mobile station (MS) within a blanket area. The remote module converts signals received from the MS into IF signals and outputs the signals to the donor module through the path. The donor module converts the IF signals provided from the remote module through the path into serving frequency signals and transmits the signals to the BS. Therefore, the present invention easily removes blanket areas in a building at a low cost.

8 Claims, 8 Drawing Sheets

SYSTEM AND METHOD FOR IN-BUILDING MOBILE COMMUNICATIONS

BACKGROUND OF THE INVENTION (a) Field of the Invention

The present invention relates to a system and method for mobile communications. More specifically, the present invention relates to a system and method for mobile communications which remove blanket areas of communications using a mobile repeater.

(b) Description of the Related Art

Conventional mobile communications systems comprise base stations (BS), base station controllers (BSC), a mobile switching center (MSC), and mobile stations (MS).

The BSs communicate with the MSs using predetermined frequencies, and each BS has a predetermined communications area. Therefore, a plurality of BSs is arranged in a suitable manner so that communications areas of adjacent BSs partially overlap to create a large area where mobile communications can take place.

However, even though with the above-mentioned arrangement an entire city can be covered, blanket areas where no communications are possible come to be formed in underground spaces of large buildings, interior spaces of skyscrapers, etc. As a result, communications service can not be provided to users in such blanket areas.

To solve the formation of the blanket areas, radio frequency (RF) repeaters are provided in those areas.

FIG. 1 is a schematic diagram of a conventional in-building repeater used in code division multiple access (CDMA) communications.

As shown, the in-building repeater comprises duplexers 11 and 16; low noise amplifiers 12 and 17; pre-amplifiers 13 and 18; intermediate frequency (IF) modules 14 and 19; surface acoustical wave (SAW) filters 1 and 4; mixers 2 and 3; and power amplifiers 15 and 20.

An operation of the in-building repeater of the above configuration will now be described.

When RF signals are received from a BS through a directional antenna 10, the received signals are transmitted to the low noise amplifier 12 in the transmission direction through the duplexer 11. The low noise amplifier 12 and the pre-amplifier 13 then amplify the signals, and the IF module 14 converts the amplified signals into intermediate frequency signals. After the signals are output from the IF module 14, noise is removed from the signals in the SAW filter 1, and then converted into RF signals in the mixer 2. The converted signals are amplified in the power amplifier 15, pass through the duplexer 16, then are radiated through in-building antennas or leakage coaxial cables.

On the other hand, the RF signals transmitted from a MS of a subscriber are received through the in-building antennas or leakage coaxial cables, passed through the duplexer 16, and amplified by the low noise amplifier 17 and pre-amplifier 18. The RF signals amplified by the pre-amplifier 18 are converted into IF signals in the IF module 19, and signal noise is removed through the SAW filter 4, after which the signals are converted into RF signals through the mixer 3. The converted RF signals are amplified by the power amplifier 20, passed through the duplexer 11, then radiated from the antenna 10 to be transmitted to the BS.

The in-building repeater using the conventional antenna can be used only on a single floor or one particular space of a building. Therefore, in order to radiate the waves to many floors, the leakage coaxial cables are utilized.

However, since waves are radiated only along the paths where the leakage coaxial cable lies in the conventional in-building repeater, a cable of substantial length must be used in large buildings. As a result, transmission loss occurs as signals travel the distance of the cable. In addition, installation of the cable becomes complex with the increased length of the same, and the costs involved in installing the lengthy cable are high.

Optionally, a light dispersion antenna is used which converts the RF signals into light waves and radiates the light signals to the blanket areas in a building.

FIG. 2 is a schematic diagram of an in-building repeater using a conventional light dispersion antenna.

As shown, the repeater comprises duplexers 36 and 40; low noise amplifiers 22 and 39; mixers 23, 25, 31, and 34; filters 24, 26, 29, and 32; light transmitters 27 and 38; light receivers 28 and 36; a light dispersion antenna 41; and power amplifiers 35 and 37.

The operation of the repeater using the light dispersion antenna is similar to that of the previously described repeater. But in contrast, the RF signals are converted into light signals to be transmitted through optic cables, and the light signals are radiated to the blanket areas using the light dispersion antenna 41.

However, the installation of the repeater using the optic cables and light dispersion antenna involves great costs.

SUMMARY OF THE INVENTION

It is an object of the present invention to provide a system and method of mobile communications for reducing blanket areas in a building at a low cost.

In one aspect of the present invention, a mobile communications system comprises a base station (BS) transmitting and receiving signals by a predetermined serving frequency signal; a donor module coupled to the BS, the donor module converting output signals of the BS into intermediate frequency (IF) signals and outputting the converted signals to a path, and the donor module converting the IF signals provided from the path into serving frequency signals and transmitting the converted serving frequency signals to the BS; and a plurality of remote modules receiving output signals of the donor module through the path, and converting the signals into the serving frequency signals and outputting the serving frequency signals to a mobile station (MS) within a blanket area, and the remote modules converting the signals into IF signals and outputting the signals to the donor module through the path.

The donor module comprises a first duplexer performing bi-directional communications with the BS; a transmitter converting radio frequency (RF) signals provided through the first duplexer into IF signals, and amplifying and outputting the signals; a second duplexer transmitting the signals of the transmitter to a rigid (RG) cable, the second duplexer receiving IF signals through the RG cable; a receiver converting IF signals transmitted to the second duplexer into RF signals and transmitting the signals to the first duplexer; and a power controller detecting a signal level of the receiver and controlling the power of the transmitter and receiver.

The transmitter comprises a first low noise amplifier amplifying the RF signals provided through the first duplexer; a first mixer converting the RF signals into IF signals; a first surface acoustic wave (SAW) filter filtering output signals of the first mixer to obtain desired IF signals; a first variable attenuator performing power control on output signals of the first SAW filter according to external control signals; a first power amplifier performing power amplification on output signals of the first variable attenuator; a frequency shift keying (FSK) modulator outputting FSK modulated signals; a second variable attenuator controlling power according to control signals of the power controller; a first amplifier amplifying signals of the second variable attenuator; a first low pass filter performing a low pass operation on signals of the first amplifier; and an adder adding signals of the first low pass filter and the first power amplifier, and outputting resulting signals.

The receiver comprises a second SAW filter passing desired IF signals among the IF signals transmitted to the second duplexer; a second low noise amplifier amplifying output signals of the second SAW filter; a second mixer providing status control signals to the second low noise amplifier according to control of the power controller; a third variable attenuator performing power control on output signals of the second mixer according to control of the power controller; a third mixer converting signals of the third variable attenuator into RF signals; a third SAW filter passing desired RF signals among output signals of the third mixer; and a second power amplifier performing power amplification on output signals of the third SAW filter and outputting resulting signals to the first duplexer.

Each of the remote modules comprises a first duplexer performing bi-directional communications with the donor module; a transmitter converting IF signals provided through the first duplexer into RF signals, and amplifying and outputting resulting signals; a second duplexer transmitting signals of the transmitter to external blanket areas and receiving RF signals transmitted from an external MS; a receiver converting the RF signals provided to the second duplexer into IF signals and transmitting converted signals to the first duplexer; and a power controller detecting signal levels of the receiver and performing power control of the transmitter and receiver.

In another aspect of the present invention, a mobile communications system comprises a repeater transmitting and receiving signals to/from external base stations (BS) using predetermined frequency signals; a donor module coupled to the repeater, the donor module converting output signals of the repeater into intermediate frequency (IF) signals and outputting the signals to a rigid (RG) cable, and the donor module converting the IF signals provided from the RG cable into serving frequency signals and transmitting the signals to the BS; and a plurality of remote modules receiving output signals of the donor module through the RG cable, and converting the signals into serving frequency signals and outputting the signals to a mobile station (MS) within the blanket area, and the remote modules converting the signals provided from the MS into IF signals and outputting the signals to the donor module through the RG cable.

In a still further aspect of the present invention, a mobile to communications method comprises the steps of transmitting and receiving signals using predetermined frequency signals at a base station (BS); converting output signals of the BS, coupled to a donor module, into intermediate frequency (IF) signals, and performing power control on the signals and outputting the signals to a path; receiving output signals of the donor module through the path at each of a plurality of remote modules, and converting the signals into serving frequency signals and outputting the converted signals to a mobile station (MS) within a blanket area; converting signals received from the MS into intermediate frequency (IF) signals at the remote modules and outputting the signals to the donor module through the path; and converting IF signals received from the remote modules through the path into serving frequency signals at the donor module and transmitting the signals to the BS.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
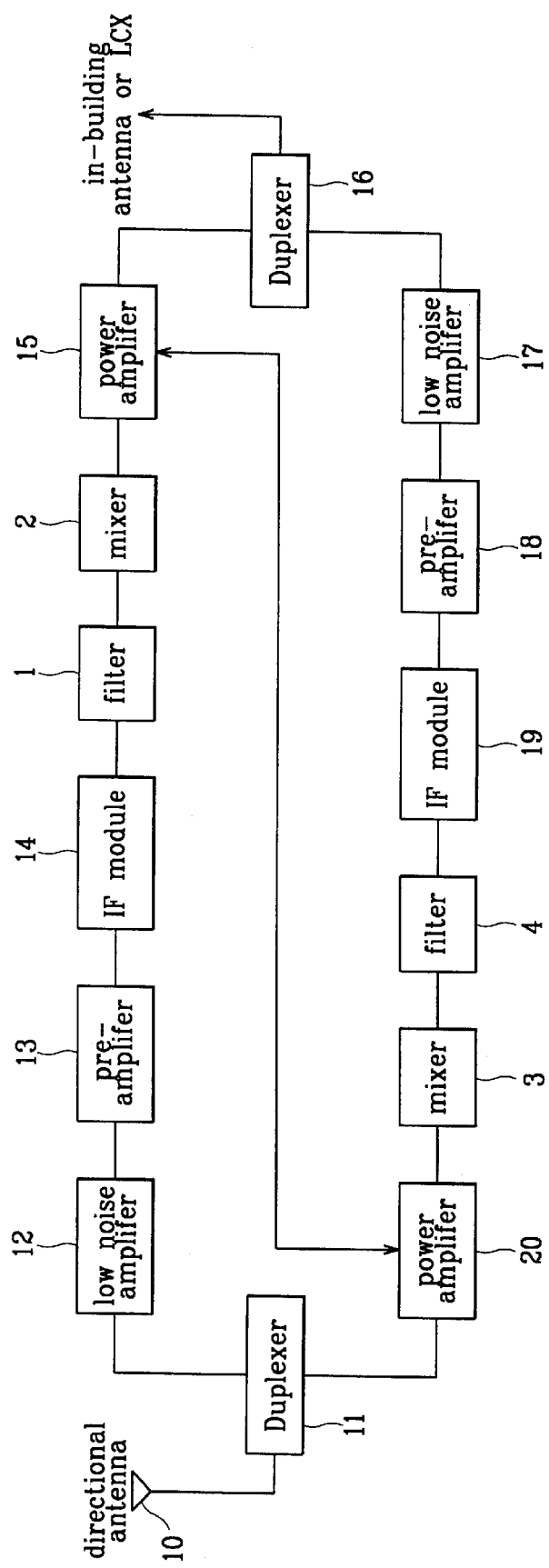
FIG. 1 is a schematic diagram of a conventional in-building repeater.
Figure 2:
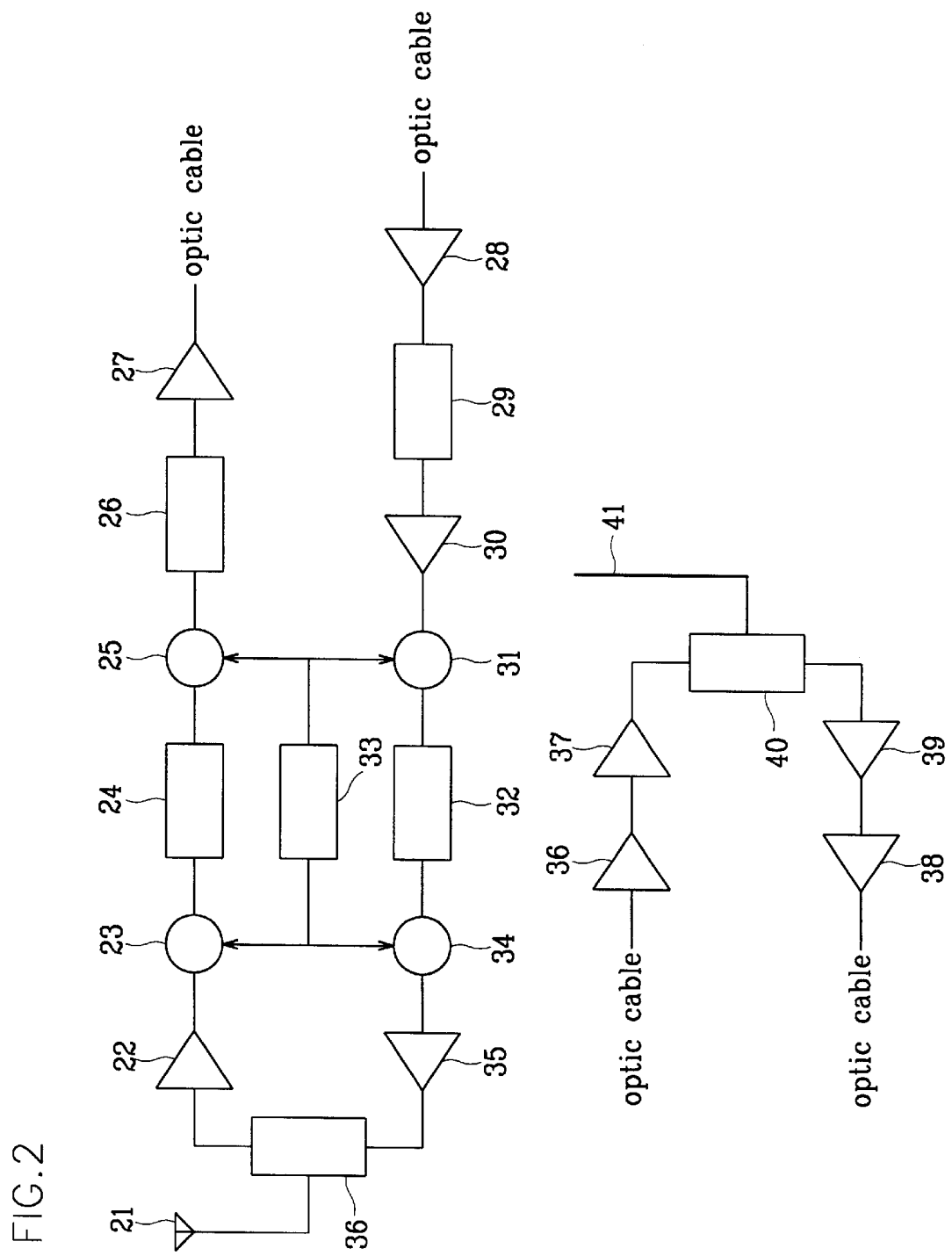
FIG. 2 is a schematic diagram of an in-building repeater using a conventional light dispersion antenna.
Figure 3:
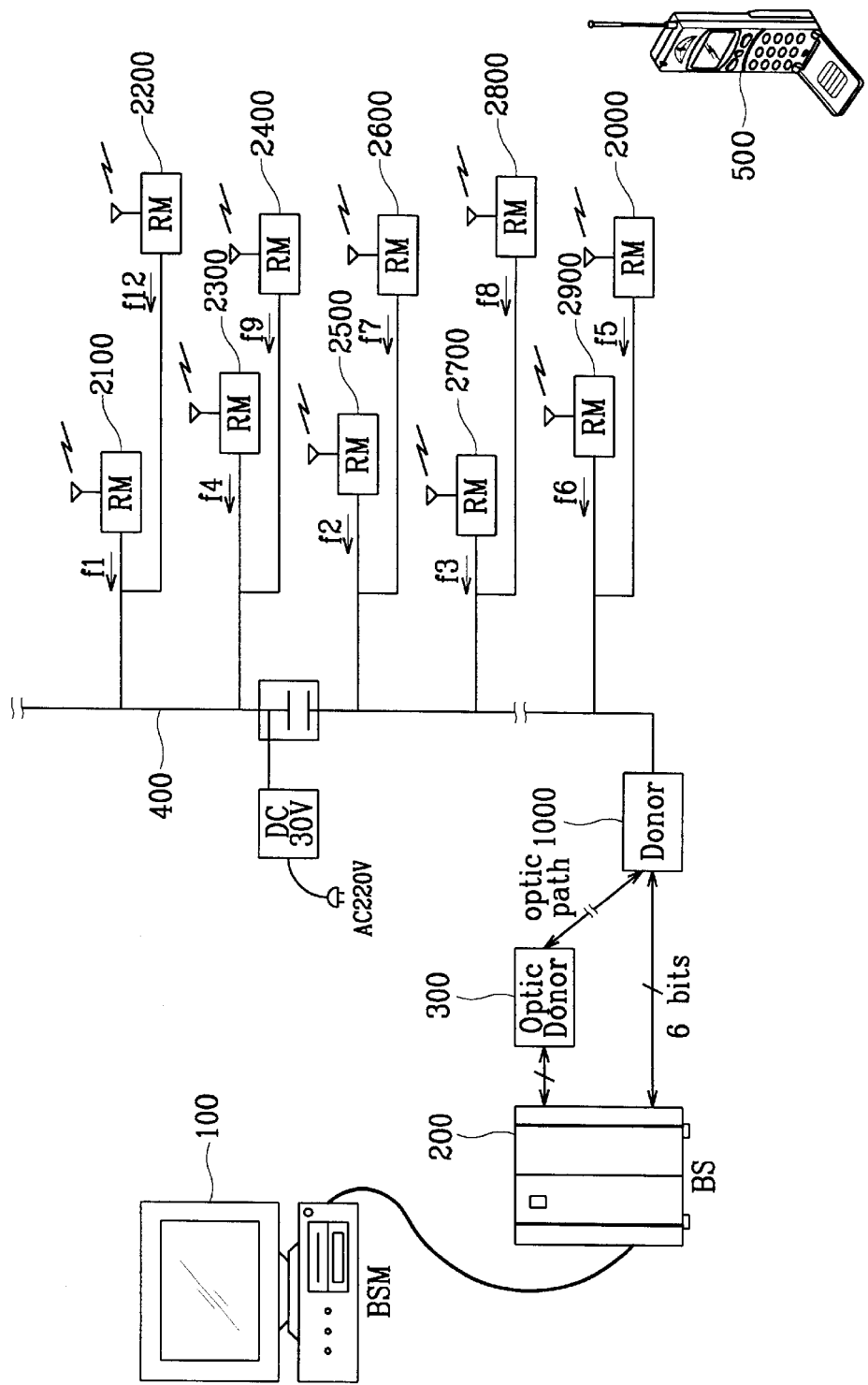
FIG. 3 is schematic diagram of a mobile communications system according to a first embodiment of the present invention.

FIG. 3 is schematic diagram of a mobile communications system according to a first embodiment of the present invention.

As shown, the mobile communications system comprises a BS 200 which outputs serving frequency signals to a MS of a subscriber; a donor module 1000 which is connected to the BS 200 through a path, receives output signals of the BS 200, converts the signals into IF signals, and outputs the IF signals to a rigid (RG) cable; a plurality of remote modules 2000 through 2900, each of which receives the output signals of the donor module 1000, converts the signals into serving frequency signals, outputs the signals to a MS 500 in a blanket area, converts the signals received from the MS 500 into IF signals, and outputs the signals to the donor module 1000 through the RG cable 400.

Operation of the mobile communications system according to the first embodiment of the present invention will now be described.

The donor module 1000 receives wire or wireless frequency signals, such as personal communications system (PCS) frequency signals of 1.8 GHz, and amplifies the signals. The donor module 100 then converts the signals into IF signals of 70 through 150 MHz. The converted IF signals are transmitted to the remote modules 2000~2900 through the RG cable 400. Each module converts the received IF signals into serving frequency signals, amplifies the signals, and outputs the signals to the MS 500 in the blanket area through an antenna. At this time, each remote module 2000~2900 continuously generates built in test (BITE) tones of 106~161 MHz and 25 KHz step single tones, and when each of the remote modules 2000~2900 is not functioning properly, generation of the tones is stopped.

Transmission signals of the MS 500 in the blanket area are transmitted to the corresponding remote modules 2000~2900. The remote modules 2000~2900 amplify the transmission signals of the MS 500, converts the signals into IF signals, then output the converted signals to the donor module 1000 through the RG cable 400. The donor module 1000 converts the signals into serving frequency signals and transmits the signals to the BS 100. Here, the donor module 1000 itself cannot assign traffic, and instead uses traffic assigned to the BS 200, thereby reducing installation costs.

The donor module 1000 also frequently checks the BITE tone signals of the remote modules 2000~2900 to determine if there are defects in the remote modules 2000~2900 or the RG cable 400. The donor module 1000 then outputs the number of defective remote modules 2000~2900 (if any) to a user alarm port of the BS 200 in the form of a binary code. Also, when the donor module 1000 itself is defective, a six-bit high signal is output. Here, the BITE tone signals control the power of the cable.

A power controller 100 displays information on how many of the remote modules 2000~2900 are defective to an alarm window according to alarm signals transmitted via the user alarm port of the BS 200.

In case of linking an optic repeater with the user alarm port of the BS 200, the alarm signal of the donor module 1000 is transmitted to an optic donor module 300 through the optic path.

Figure 4:
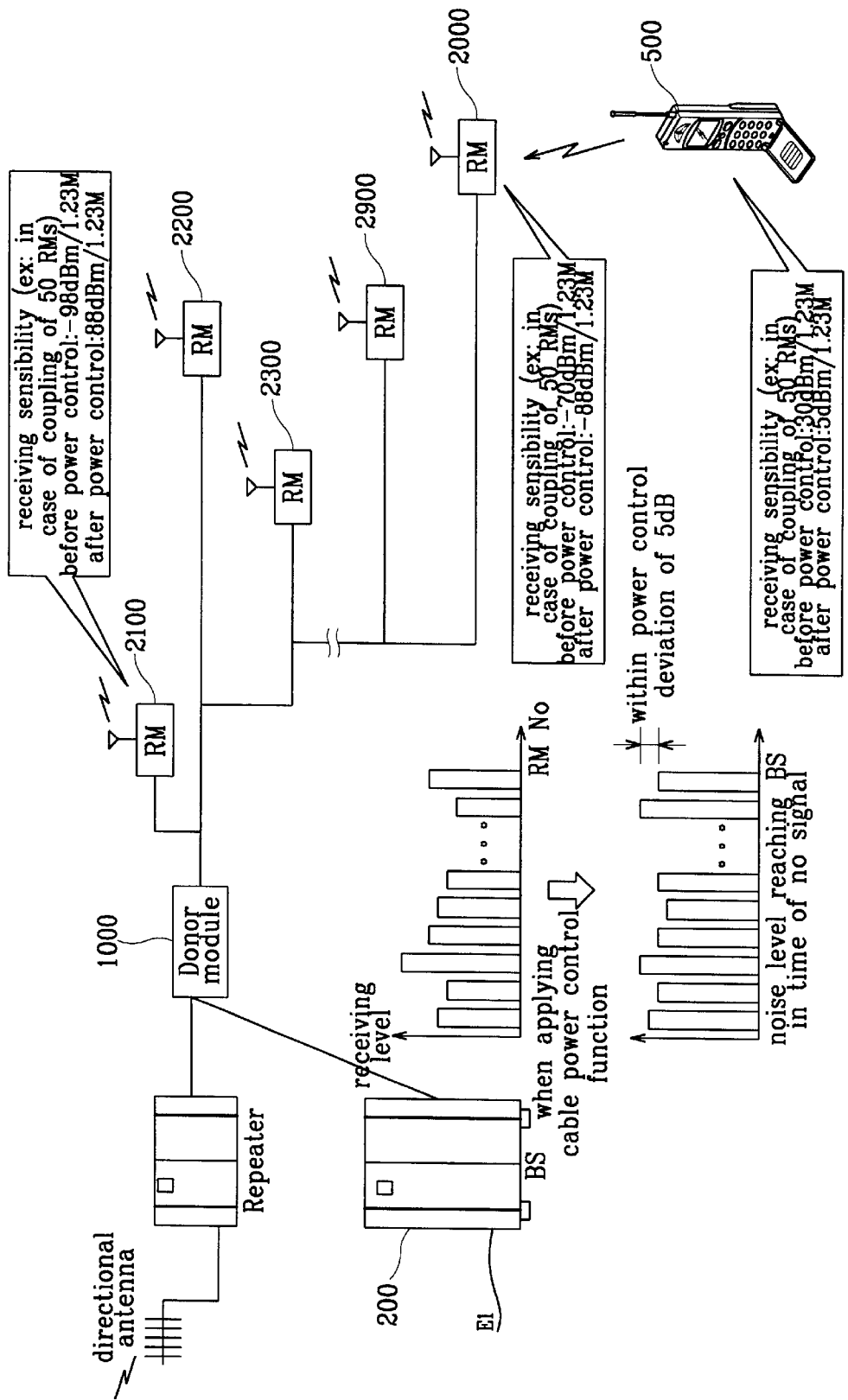
FIG. 4 shows a power control status of a mobile communications system according to a first and second embodiments of the present invention.

Power control in the above process results in maintaining a uniform receiving level as shown in FIG. 4.

FIG. 4 is a schematic diagram of a power control status of a mobile communications system according to a first and second embodiment of the present invention. The reception level of the signals transmitted to the BS is maintained at a constant value.

The donor module 1000 and remote module 2100 in the above process will now be described referring to FIGS. 5 and 8.

Figure 5:
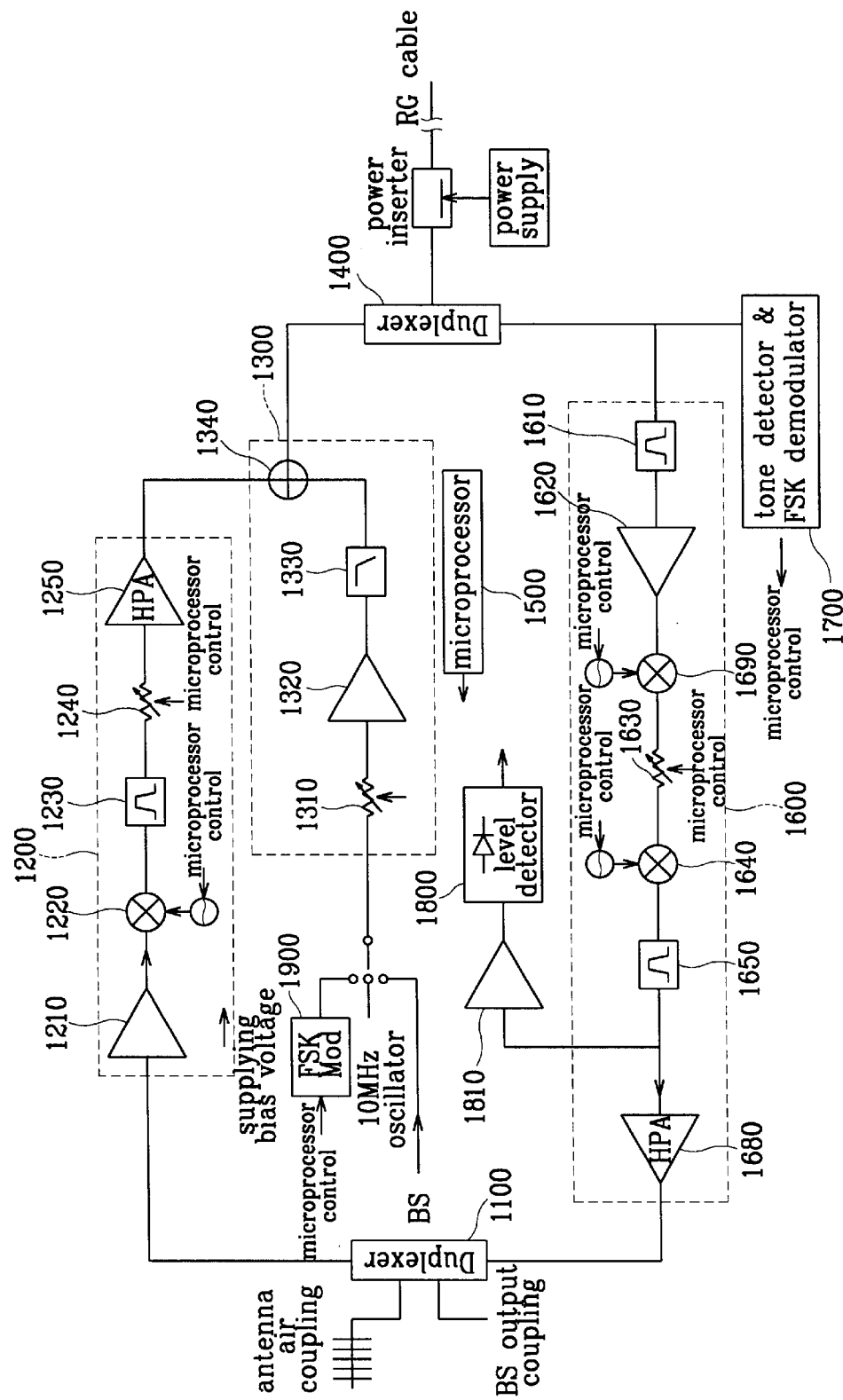
FIG. 5 is a schematic diagram of a donor module.

FIG. 5 is a schematic diagram of the donor module 1000, that is, a repeater for performing power control.

The donor module 1000 comprises:

a microprocessor 1500;

a first duplexer 1100 performing bidirectional communications with the BS 200;

a first low noise amplifier 1210 amplifying RF signals provided through the first duplexer 1100;

a first mixer 1220 converting the RF signals into IF signals;

a first SAW filter 1230 filtering output signals of the first mixer 1220 to obtain desired IF signals;

a first variable attenuator 1240 performing power control of output signals of the first SAW filter 1230 according to external control signals;

a first power amplifier 1250 performing power amplification of output signals of the first variable attenuator 1240;

a frequency shift keying (FSK) modulator 1900 outputting FSK modulation signals;

a second variable attenuator 1310 performing power control according to control signals of the microprocessor 1500;

a first amplifier 1320 amplifying signals of the second variable attenuator 1310;

a first low pass filter 1330 performing a low passing operation of signals of the first amplifier 1320;

an adder 1340 adding signals of the first low pass filter 1330 and the first power amplifier 1250, and outputting the result as signals;

a second duplexer 1400 transmitting the output signals of the adder 1340 to the RG cable 400 and receiving IF signals from the RG cable 400;

a tone detector and FSK demodulator 1700 detecting the tones of the IF signals received from the second duplexer 1400 and performing a FSK demodulation operation on the signals, after which resulting signals are transmitted to the microprocessor 1500;

a second SAW filter 1610 filtering through only signals of a desired bandwidth among the IF signals transmitted to the second duplexer 1400;

a second low noise amplifier 1620 amplifying output signals of the second SAW filter 1610;

a second mixer 1690 providing status control signals to output signals of the second low noise amplifier 1620 according to control of the microprocessor 1500;

a third variable attenuator 1630 performing power control of outputs of the second mixer 1690 according to control of the microprocessor 1500;

a third mixer 1640 converting signals of the third variable attenuator 1630 into RF signals;

a third SAW filter 1650 filtering through only RF signals from the third mixer 1640 having a desired high frequency bandwidth; and a second power amplifier 1680 performing power amplification of output signals of the third SAW filter 1650 and outputting the result to the first duplexer 1100.

Figure 6:
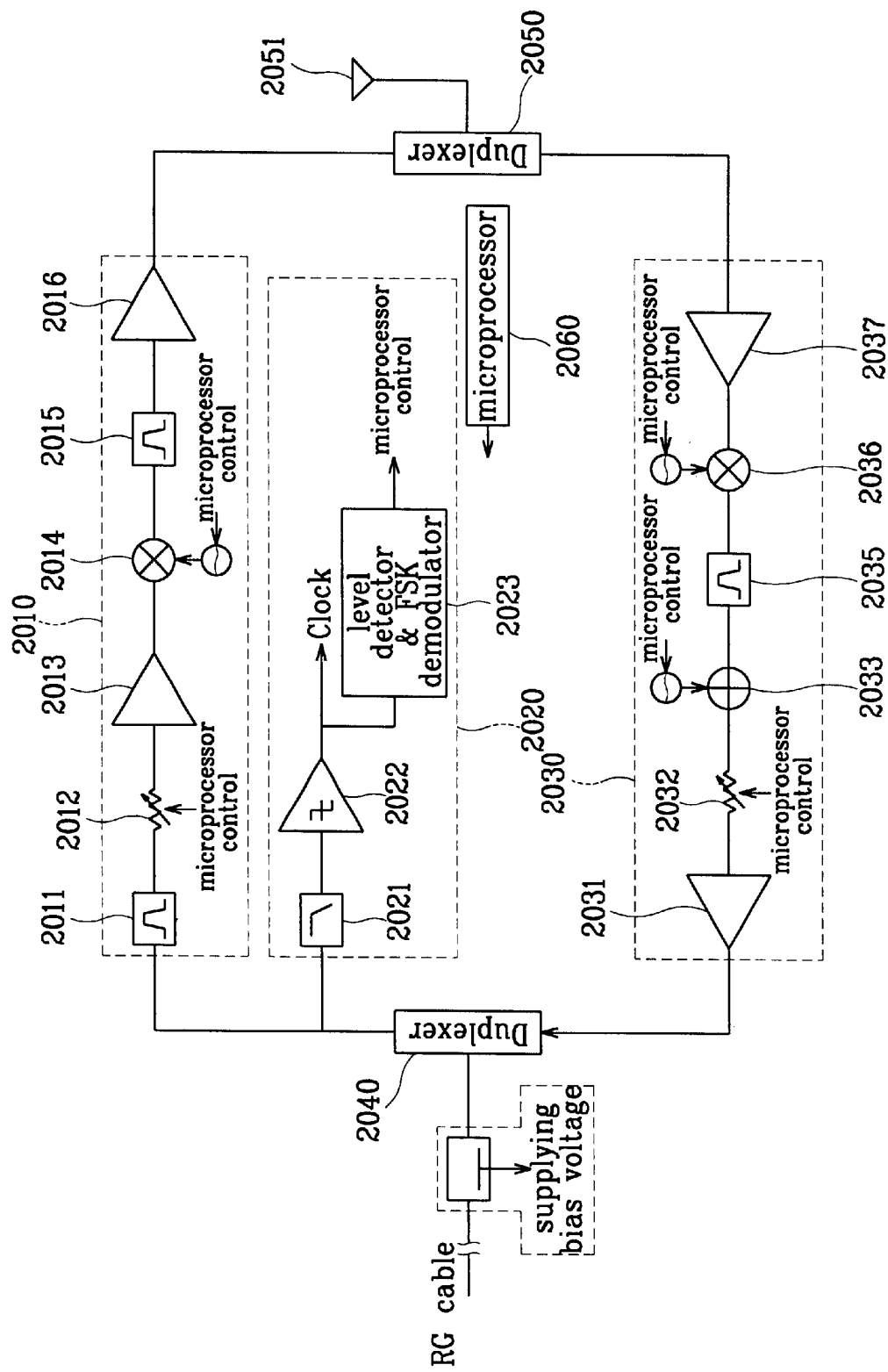
FIG. 6 is a schematic diagram of a remote module.

FIG. 6 is a schematic diagram of the remote module 2000. All the other remote modules 2100 through 2900 have an identical configuration and operate the same as the remote module 2000. Up to sixty interconnected remote modules may be used.

The remote module 2000 comprises:

a microprocessor 2060;

a third duplexer 2040 performing bidirectional communications with the donor module 1000;

a fourth SAW filter 2011 filtering through only IF signals among signals provided from the third duplexer 2040;

a fourth variable attenuator 2012 performing power control of output signals of the fourth SAW filter 2011 according to control signals of the microprocessor 2060;

a second amplifier 2013 amplifying output signals of the fourth variable attenuator 2012;

a fourth mixer 2014 converting output signals of the second amplifier 2013 into RF signals;

a fifth SAW filter 2015 filtering output signals of the fourth mixer 2014 to obtain desired RF signals;

a third power amplifier 2016 performing power amplification of output signals of the fifth SAW filter 2015;

a second low pass filter 2021 performing a low passing operation on the signals received from the third duplexer 2040;

a third amplifier 2022 amplifying signals of the second low pass filter 2021;

a level detector and FSK demodulator 2023 detecting levels of output signals of the third amplifier 2022, and performing a FSK operation and transmitting the results to the microprocessor 2060;

a fourth duplexer 2050 transmitting output signals of the third power amplifier 2016 to the MS 500 of a subscriber through an antenna 2051, and receiving signals from the MS 500;

a third low noise amplifier 2037 amplifying the signals transmitted to the fourth duplexer 2050;

a fifth mixer 2036 converting output signals of the third low noise amplifier 2037 into IF signals;

a sixth SAW filter 2035 filtering through only desired frequency signals from output signals of the fifth mixer 2036;

a sixth mixer 2033 performing FSK modulation on status control signals and providing the modulated signals to output signals of the sixth SAW filter 2035;

a fifth variable attenuator 2032 performing power control on output signals of the sixth mixer 2033 according to control of the microprocessor 2060; and a fourth power amplifier 2031 amplifying power of output signals of the fifth variable attenuator 2032 and outputting the results to the third duplexer 2040.

Operation of the donor module 1000 and the above-described remote module 2000 will now be described.

Wire or wireless RF signals of 1.8~1.9 GHz are transmitted to the duplexer 1100 from the BS 200. The RF signals are amplified by the low noise amplifier 1210 and converted into IF signals by the mixer 1220. Only IF signals among the converted signals are passed through the SAW filter 1230, while signals of other frequencies are filtered out. The microprocessor 1500 performs power control on the output signals of the SAW filter 1230 through the variable attenuator 1240. The output signals of the variable attenuator 1240 are amplified by the power amplifier 1250, and output to the adder 1340.

On the other hand, the FSK modulator 1900 outputs FSK modulated signals. At this time, in case of being linked with the BS 200, signals of 10 MHz can directly be provided from an oscillator (not shown). The variable attenuator 1310 performs power control on the FSK signals according to control signals of the microprocessor 1500, and outputs the results. The output signals are amplified by the amplifier 1320, and low signals are transmitted to the adder 1340 through the low pass filter 1330. At this time, the signals output from the low pass filter 1330 are changed to a predetermined level for performing power control.

The adder 1340 adds signals of the low pass filter 1330 and power amplifier 1250, and outputs the resulting signals to the duplexer 1400. The duplexer 1400 transmits the signals to the remote module 2000 in the building through the RG cable 400. Here, the RG cable can be substituted with coaxial cables or CATV cables.

The IF signals transmitted through the RG cable 400 are received by the duplexer 2040 of the remote module 2000. Among the signals received through the duplexer 2040, only the IF signals transmitted are passed through the SAW filter 2011.

On the other hand, signals received at the duplexer 2040 are low-pass-filtered by the low pass filter 2021, and amplified by the amplifier 2022, after which FSK demodulation is performed by the level detector and FSK demodulator 2023. At this time, a receiving level is detected, and the detected level is transmitted to the microprocessor 2060. The microprocessor 2060 checks to what level the receiving level is decreased, and performs power control. That is, the variable attenuator 2012 performs power control on the output signals of the SAW filter 2011 according to control signals of the microprocessor 2060. Accordingly, a decreased amount of the output signals of the SAW filter 2011 is compensated for, after which the resulting signals are output by the variable attenuator 2012.

Output signals of the variable attenuator 2012 are amplified by the amplifier 2013 and converted into RF signals by the mixer 2014. The SAW filter 2015 filters the output signals of the mixer 2014 in order to obtain desired RF signals. The power amplifier 2016 performs power amplification on the output signals of the SAW filter 2015 and outputs the resulting signals to the duplexer 2050. The duplexer 2050 outputs the output signals of the power amplifier 2016 to the MS 500 of the subscriber through an antenna 2051. Therefore, the blanket area within the building is removed.

On the other hand, signals transmitted from the MS 500 are transmitted to the duplexer 2050 through the antenna 2051, amplified by the low noise amplifier 2037, and converted into IF signals by the mixer 2036. The SAW filter 2035 passes through only IF signals among the output signals of the mixer 2036. The mixer 2033 performs FSK modulation on the status control signals according to control of the microprocessor 2060 and outputs the modulated status control signals to the output signals of the SAW filter 2035. The variable attenuator 2032 performs power control on the output signals of the mixer 2033 according to control of the microprocessor 1500. The output signals of the variable attenuator 2032 are amplified by the power amplifier 2031 and output to the duplexer 2040. The duplexer 2040 transmits the output signals of the power amplifier 2031 to the donor module 1000 through the RG cable 400. The duplexer 1400 of the donor module 1000 receives IF signals and outputs the signals to both a receiver 1600 and the tone detector and FSK demodulator 1700. The tone detector and FSK demodulator 1700 detects tones from the IF signals provided to the duplexer 1400, performs FSK demodulation, and transmits the results to the microprocessor 1500.

The SAW filter 1610 of the receiver 1600 passes through only desired frequency signals among the IF signals transmitted to the duplexer 1400, and the low noise amplifier 1620 amplifies the output signals of the SAW filter 1610. The mixer 1690 provides the status control signals to the output signals of the low noise amplifier 1620 according to control of the microprocessor 1500.

The variable attenuator 1630 performs power control on the output signals of the mixer 1690 according to control of the microprocessor 1500, and outputs the resulting signals. At this time, the microprocessor 1500 performs power control according to the tone signals, that is, the status control signals detected from the tone detector and FSK demodulator 1700. The mixer 1640 converts the signals of the variable attenuator 1630 into RF signals, and the SAW filter 1650 passes through only desired RF signals from the output signals of the mixer 1640. The output RF signals are amplified by the power amplifier 1680, and transmitted to the BS 200 via the duplexer 1100 through a wire or through a wireless process. Following the above process, the MS 500 is coupled to the BS 200, and thereby, the blanket area is removed.

Figure 7:
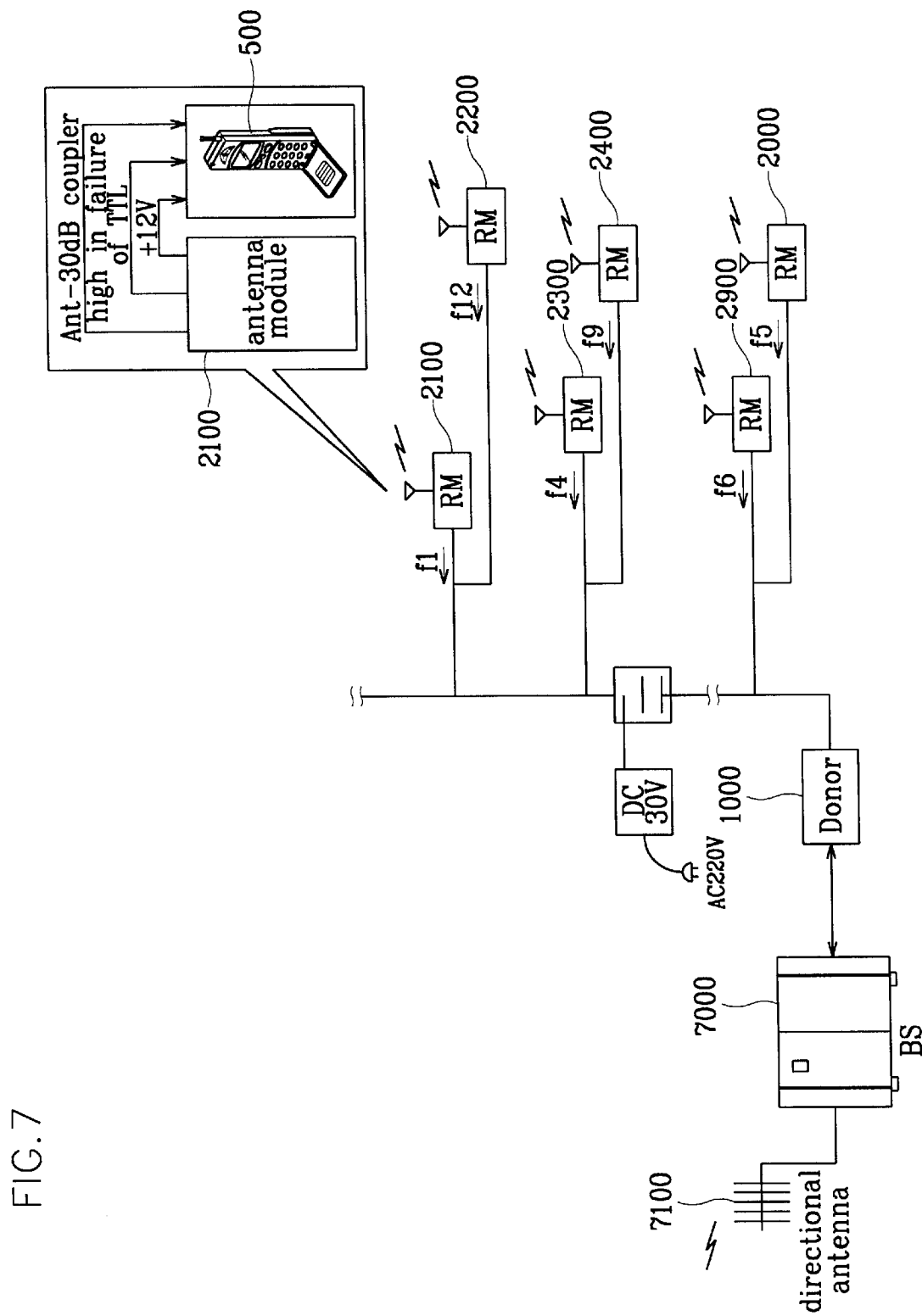
FIG. 7 is a schematic diagram of the mobile communications system according to a second embodiment of the present invention.

FIG. 7 shows a schematic diagram of a second embodiment of the present invention. In the second embodiment, instead of the BS, a repeater 7000 is used.

Referring to FIG. 7, the MS 500 is coupled to the repeater 7000 instead of the BS 200. To perform power control, a terminal module is installed beside the remote module 2100 farthest from the donor module 1000, and the status of the in-building system is checked using test calls in the network management system (NMS) as in the case of conventional repeater management.

The terminal module has a structure similar to the remote modules 2000~2900, and a call from outside a building is not made because of a 50 dB shield. Also, a four-pin connector (not shown) is installed on the remote module 2000 for linking with the terminal module.

Figure 8:
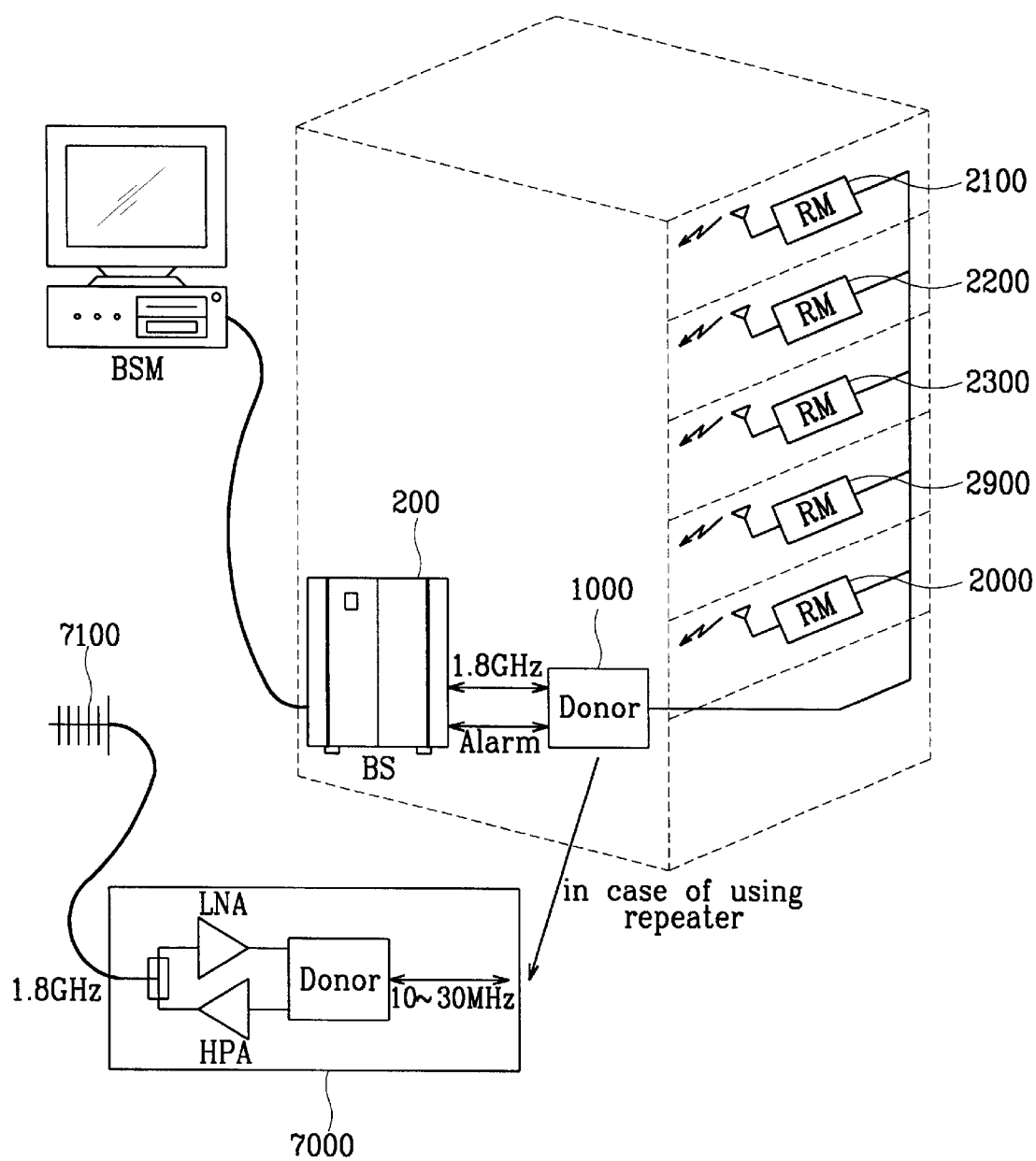
FIG. 8 shows an example of applying the first and second embodiments to a building.

FIG. 8 shows an example of applying the first and second embodiments to a building.

As shown, the blanket area can be removed at a low cost by linking the donor module 1000 with a plurality of remote modules 2000~2900 using the RG cable.

The present invention is not limited to the PCS system, but can also be applied to general mobile communications systems.

The present invention greatly reduces costs and easily removes blanket areas.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A mobile communications system, comprising:
   a base station (BS) transmitting and receiving signals by a predetermined serving frequency signal;
   a donor module coupled to the BS, the donor module converting output signals of the BS into intermediate frequency (IF) signals and outputting the converted signals to a path, and the donor module converting the IF signals provided from the path into serving frequency signals and transmitting the converted serving frequency signals to the BS, wherein the donor module comprises:
      a first duplexer performing bi-directional communications with the BS;
      a transmitter converting radio frequency (RF) signals provided through the first duplexer into IF signals, and amplifying and outputting the signals;
      a second duplexer transmitting the signals of the transmitter to a rigid (RG) cable, the second duplexer receiving IF signals through the RG cable;
      a receiver converting IF signals transmitted to the second duplexer into RF signals and transmitting the signals to the first duplexer; and
      a power controller detecting a signal level of the receiver and controlling the power of the transmitter and receiver; and
   a plurality of remote modules receiving output signals of the donor module through the path, and converting the signals into the serving frequency signals and outputting the serving frequency signals to a mobile station (MS) within a blanket area, and the remote modules converting the signals into IF signals and outputting the signals to the donor module through the path.

2. The system of claim 1, wherein the transmitter comprises:
   a first low noise amplifier amplifying the RF signals provided through the first duplexer;
   a first mixer converting the RF signals into IF signals;
   a first surface acoustic wave (SAW) filter filtering output signals of the first mixer to obtain desired IF signals;
   a first variable attenuator performing power control on output signals of the first SAW filter according to external control signals;
   a first power amplifier performing power amplification on output signals of the first variable attenuator;
   a frequency shift keying (FSK) modulator outputting FSK modulated signals;
   a second variable attenuator controlling power according to control signals of the power controller;
   a first amplifier amplifying signals of the second variable attenuator;
   a first low pass filter performing a low pass operation on signals of the first amplifier; and
   an adder adding signals of the first low pass filter and the first power amplifier, and outputting resulting signals.

3. The system of claim 1, wherein the receiver comprises:
   a second SAW filter passing desired IF signals among the IF signals transmitted to the second duplexer;
   a second low noise amplifier amplifying output signals of the second SAW filter;
   a second mixer providing status control signals to the second low noise amplifier according to control of the power controller;
   a third variable attenuator performing power control on output signals of the second mixer according to control of the power controller;
   a third mixer converting signals of the third variable attenuator into RF signals;
   a third SAW filter passing desired RF signals among output signals of the third mixer; and
   a second power amplifier performing power amplification on output signals of the third SAW filter and outputting resulting signals to the first duplexer.

4. A mobile communications system, comprising:
   a base station (BS) transmitting and receiving signals by a predetermined serving frequency signal;
   a donor module coupled to the BS, the donor module converting output signals of the BS into intermediate frequency (IF) signals and outputting the converted signals to a path, and the donor module converting the IF signals provided from the path into serving frequency signals and transmitting the converted serving frequency signals to the BS; and
   a plurality of remote modules receiving output signals of the donor module through the path, and converting the signals into the serving frequency signals and outputting the serving frequency signals to a mobile station (MS) within a blanket area, and the remote modules converting the signals into IF signals and outputting the signals to the donor module through the path, wherein each of the remote modules comprises:
      a first duplexer performing bidirectional communications with the donor module;
      a transmitter converting IF signals provided through the first duplexer into RF signals, and amplifying and outputting resulting signals;
      a second duplexer transmitting signals of the transmitter to external blanket areas and receiving RF signals transmitted from an external MS;
      a receiver converting the RF signals provided to the second duplexer into IF signals and transmitting converted signals to the first duplexer; and
      a power controller detecting signal levels of the receiver and performing power control of the transmitter and receiver.

5. A mobile communications system, comprising:
   a repeater transmitting and receiving signals to/from external base stations (BS) using predetermined frequency signals;

a donor module coupled to the repeater, the donor module converting output signals of the repeater into intermediate frequency (IF) signals and outputting the signals to a rigid (RG) cable, and the donor module converting the IF signals provided from the RG cable into serving frequency signals and transmitting the signals to the BS; wherein the donor module comprises:

a first duplexer performing bi-directional communications with the repeater;

a transmitter converting radio frequency (RF) signals provided through the first duplexer into IF signals, and amplifying and outputting the signals;

a second duplexer transmitting the signals of the transmitter to a rigid (RG) cable, the second duplexer receiving IF signals through the RG cable;

a receiver converting IF signals transmitted to the second duplexer into RF signals and transmitting the signals to the first duplexer; and a power controller detecting a signal level of the receiver and controlling the power of the transmitter and receiver; and a plurality of remote modules receiving output signals of the donor module through the RG cable, and converting the signals into serving frequency signals and outputting the signals to a mobile station (MS) within the blanket area, and the remote modules converting the signals provided from the MS into IF signals and outputting the signals to the donor module through the RG cable.

6. The system of claim 5, wherein the transmitter comprises:

a first low noise amplifier amplifying the RF signals provided through the first duplexer;

a first mixer converting the RF signals into IF signals;

a first surface acoustic wave (SAW) filter filtering output signals of the first mixer to obtain desired IF signals;

a first variable attenuator performing power control on output signals of the first SAW filter according to external control signals;

a first power amplifier performing power amplification on output signals of the first variable attenuator;

a frequency shift keying (FSK) modulator outputting FSK modulated signals;

a second variable attenuator controlling power according to control signals of the power controller;

a first amplifier amplifying signals of the second variable attenuator;

a first low pass filter performing a low pass operation on signals of the first amplifier; and an adder adding signals of the first low pass filter and the first power amplifier, and outputting resulting signals.

7. The system of claim 5, wherein the receiver comprises:

a second SAW filter passing desired IF signals among the IF signals transmitted to the second duplexer;

a second low noise amplifier amplifying output signals of the second SAW filter;

a second mixer providing status control signals to the second low noise amplifier according to control of the power controller;

a third variable attenuator performing power control on output signals of the second mixer according to control of the power controller;

a third mixer converting signals of the third variable attenuator into RF signals;

a third SAW filter passing desired RF signals among output signals of the third mixer; and a second power amplifier performing power amplification on output signals of the third SAW filter and outputting resulting signals to the first duplexer.

8. A mobile communications system, comprising:

a repeater transmitting and receiving signals to/from external base stations (BS) using predetermined frequency signals;

a donor module coupled to the repeater, the donor module converting output signals of the repeater into intermediate frequency (IF) signals and outputting the signals to a rigid (RG) cable, and the donor module converting the IF signals provided from the RG cable into serving frequency signals and transmitting the signals to the BS; and a plurality of remote modules receiving output signals of the donor module through the RG cable, and converting the signals into serving frequency signals and outputting the signals to a mobile station (MS) within the blanket area, and the remote modules converting the signals provided from the MS into IF signals and outputting the signals to the donor module through the RG cable, wherein each of the remote modules comprises:

a first duplexer performing bi-directional communications with the donor module;

a transmitter converting IF signals provided through the first duplexer into RF signals, and amplifying and outputting resulting signals;

a second duplexer transmitting signals of the transmitter to external blanket areas and receiving RF signals transmitted from an external MS;

a receiver converting the RF signals provided to the second duplexer into IF signals and transmitting converted signals to the first duplexer; and a power controller detecting signal levels of the receiver and performing power control of the transmitter and receiver.

* * * * *